INVENTOR:
YPE SCHAAFSMA
BY: *Oswald H. Milmore*
HIS ATTORNEY 3,090,674
HEATING FLUIDS BY A SPINNING BODY
Ype Schaafsma, Amsterdam, Netherlands, assignor to Shell Oil Company, New York, N.Y., a corporation of Delaware
Filed Feb. 23, 1961, Ser. No. 91,116
Claims priority, application Great Britain Mar. 21, 1960
10 Claims. (Cl. 23—277)

This invention relates to the supplying of heat to fluids and is particularly concerned with a process and apparatus for the continuous transfer of thermal energy to fluids with very short contact times. By a "very short contact time" is meant an average time on the order of fractions of a second, e.g., a few hundredths of a second.

The process for the rapid transfer of thermal energy to a fluid according to the present invention comprises passing the fluid upwards in contact with a rapidly spinning rotation-symmetrical heating element that is freely suspended in the stream of the fluid and maintaining said heating element at a high temperature, whereby the fluid is heated by convection of heat from said element. "Free suspension" denotes that the heating element is supported entirely by the pressure of the fluid stream. An apparatus according to the present invention, suitable for carrying out the process defined above, comprises a vessel enclosing a reaction space and formed with a discharge passage from said reaction space, a fluid supply tube opening upwards into said reaction space, a rotation-symmetrical heating element adapted to be freely suspended at the mouth of said supply tube by fluid flowing through said mouth and means for generating thermal energy in said heating element for the heating of the fluid. The most convenient means for generating thermal energy in the suspended heating element are electrical heating means working by induction, magnetic hysteresis, or capacitance, though other energy-generating means may be devised, e.g., by bringing about nuclear reactions in the heating element.

By means of the process and apparatus according to the invention rapid heating of the fluid flowing past the heating element is effected in a very short contact time, while the element has no direct contact with other parts of the apparatus so that material stresses which are the principal cause of difficulties in heating means working at very high temperatures, such as pipe stills working by indirect heating on the reaction space at temperatures up to 1400° or 1800° C., do not arise. For the same reason the use of special materials, such as zirconium oxide and aluminum oxide, or expensive metals such as are essential in heating vessels in which current is passed through the wall of the vessel itself to attain temperatures up to 2000° C., becomes unnecessary. Metals otherwise suitable for this purpose, such as tungsten and molybdenum, are reactive at such temperatures and liable to oxidation, while graphite tubes give rise to difficulties from the porosity and low mechanical strength of the graphite.

The invention has the further advantage of giving a high degree of control over the reaction, thus overcoming a difficulty that is particularly great when it is necessary to heat and cool fluids very rapidly in order to prevent undesirable preliminary, side or subsequent reactions. Further, the invention is free from a difficulty that arises when a fixed heating element of suitable material, e.g., graphite, is heated by means of a high-frequency induction current, namely, the formation of a "wake zone" or "shadow zone" beyond the element in the line of flow, which zone leads to a low temperature gradient and is apt to afford an opportunity for undesirable side reactions and for the formation on the surfaces of the apparatus of deposits which have a harmful effect on the material of the apparatus and give rise to disturbances in flow, variations of temperature, and consequent material stresses resulting in cracks and fractures.

The avoidance of a "shadow zone" in an apparatus in accordance with the invention appears to be due to the rotation of the heating element, which permits the layer of fluid which first comes into contact with the element to maintain that contact, on the down stream side of the element, over a greater part of the surface of the element than would be the case if the element were stationary. Furthermore, the rotation of the element nullifies or reduces any localization there may be at particular zones of the element, in the generation of thermal energy in the element. These effects, combined, increase both the uniformity of temperature of the surface of the element and the uniformity and extent of contact therewith of the fluid to be heated.

The invention is of particular advantage in bringing about reactions in which the reaction products are unstable at the temperatures prevailing during the reaction, of at slightly lower temperatures, which makes it desirable that the reactions should be carried out within very narrow temperature ranges and followed by a rapid cooling to a lower temperature, e.g., by quenching. The short contact time of the fluid with the heating element of the present invention enables the fluids to be rapidly raised to the desired temperature level, so preventing the occurrence of undesirable preliminary reactions. The fluids are rapidly cooled after the termination of contact.

Such rapid cooling can be effected in cases, where the transfer of energy is confined to a thin layer of fluid close to the heating element, simply by a rapid mixing of the heated portion with the remainder of the stream. The avoidance of a "shadow zone," which is equivalent to a zone of gradual mixing, encourages rapid mixing and consequently rapid cooling of the heated material. The absence of a "shadow zone" beyond the element in the line of flow also avoids an undesirable long residence time of the reaction products in the close vicinity of the heating element. Even if a relatively thick layer of fluid is heated so that mixing with the remainder of the stream does not sufficiently cool the reaction products, effective cooling is possible by applying additional cooling of the whole fluid stream immediately after the heating element has been passed. Thus, cooling can be effected in part or substantially wholly by other means, for example, by the introduction of a quenching stream of cooling fluid to mix with the reacting fluid on the downstream side of the heating element, or by the provision of a closed cooling heat-exchange element on the downstream side of the heating element.

The invention is suitable both for the rapid heating of a mixture of fluids, e.g., for the purpose of initiating and/or maintaining a reaction, and for heating a single fluid. The fluid preferably consists of a gas or a mixture of gases but may also be a liquid or a mixture of liquids, or a suspension of one or more of solids in a liquid, or even a dispersion of one or more solids or liquids in a gas or gas mixture, e.g., in the form of a mist.

The heating element is preferably spherical in shape, though any body having an axis of symmetry and preferably a plane of symmetry at right angles to the axis may be employed. Examples are cylinders of circular or polygonal cross sections or sphere-like bodies with flat facets. The mouth of the supply tube with which the heating element cooperates is prefarbly in the form of a calyx, concave on the inside, so as to match in some degree the shape of the element, although this shape is not essential. Rapid rotation of the element can occur naturally, being induced by the stream of fluid wherein it is suspended. Rotation generally occurs about an axis at right angles to the line of flow of the fluid. However, it may be possible to arrange for the element to rotate about an axis parallel to the line of flow of the fluid, e.g., by an induction-motor effect of fluctuating electric currents by which the thermal energy is generated in the element.

The invention will now be elucidated with reference to the accompanying drawing forming a part of this specification and showing these embodiments by way of example, wherein.

Figure 1:
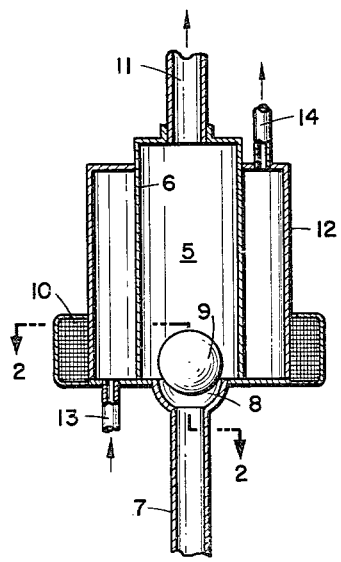
FIGURE 1 is a vertical sectional view through one embodiment.
Figure 2:
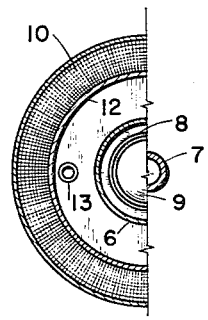
FIGURE 2 is a sectional view taken on the broken line 2—2 of FIGURE 1.

Referring to FIGURES 1 and 2, reference numeral 5 denotes a reaction space or chamber defined by a wall 6 into one end of which a supply tube 7 for the fluids to be treated opens upwards by way of a mouth 8. A symmetrical heating element in the form of a solid or hollow sphere 9 is freely suspended at the mouth 8 by fluid flowing upwards through the mouth. The internal surface of the mouth may conform to a hemisphere having a diameter slightly larger than that of the sphere 9.

Around the reaction space 5 is situated the electrical load or end coil 10 which is connected to a source of electrical energy (not shown) by which the sphere 9 can be heated by induction.

The chamber 5 has a discharge pipe 11, situated opposite the supply tube 7. The chamber is also provided with a cooling jacket 12 having a supply pipe 13 and a discharge pipe 14 for coolant.

Figure 3:
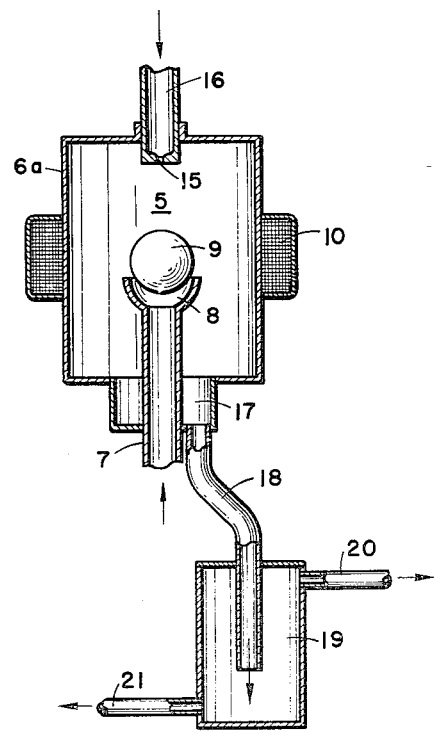
FIGURE 3 is a vertical sectional view of an alternative embodiment.

In the embodiment shown in FIGURE 3, reference numbers 5 and 7–10 denote parts as previously described. The wall 6a which defines the chamber 5 extends downwards below the mouth of the supply tube 7 and carries, at the top, a spray nozzle 15 which projects downwards into the reaction space opposite the supply tube 7. Through this nozzle a coolant, such as a gas or liquid, supplied by a pipe 16, is directly injected into the reaction space. A discharge zone 17 forming a sump of the chamber 5 is provided for receiving the spent coolant and reacted fluids and surrounds the supply tube 7; this zone is connected via a discharge pipe 18 to a separator 19 in which the coolant is separated from the fluids when these are respectively liquid and gaseous. The separator 19 is provided with an outlet 20 for the fluids and an outlet 21 for the coolant.

During operation of either embodiment the sphere 9, being lifted off the mouth 8 by a gaseous stream of fluid which is suitably preheated to a temperature below reaction temperature, is given a spinning movement by the gas because the sphere naturally assumes a position offset slightly from the vertical axis of the mouth. The floating sphere 9 is simultaneously heated inductively by the coil 10, to which high-frequency electrical energy is supplied. It has been found that it was possible to raise the temperature of the sphere 9 to between 2500 and 3000° C. and even higher.

The embodiment of FIGURES 1 and 2 is useful for cases in which it is undesirable that there should be a direct heat exchange between a coolant and the reaction products.

In an apparatus built on a laboratory scale the average throughput capacity when heating gases was of the order of 1000 liters per hour. The supply tube 7 had an internal diameter of 0.2 cm., and the heating element was a sphere made of graphite having a diameter of 1.2 cm. The reaction chamber had an internal diameter of 1.6 cm. With this apparatus temperatures of 3000° C. and over were reached. Typical rotation speeds, measured in actual operation, are between 30 and 50 revolutions per second. These speeds are not believed to be critical. The velocities of the gas in the supply tube could be varied from about 40 to about 200 meters/sec., without substantial alteration in the position of the sphere. This showed that the apparatus permits stable and flexible operation. The stability of the sphere was such that during operation it was kept in a substantially fixed position with regard to the mouth independent of the position of the mouth and supply tube with regard to the vertical.

*Example*

The following experiment was conducted in an apparatus of the above-mentioned construction and dimensions.

A mixture of methane and nitrogen was passed through the supply tube and past the heated sphere.

Gas rates:
  Methane _____ 210 liters/hour.
  Nitrogen _____ 430 liters/hour.
Average velocity in the supply tube___ About 60 m./sec.

Optically measured temperature of the ball about 2450° C. which, after correction, corresponds with a temperature of about 2750° C.

Analysis of the media collected from the reaction space showed the formation of hydrogen cyanide.

Figure 4:
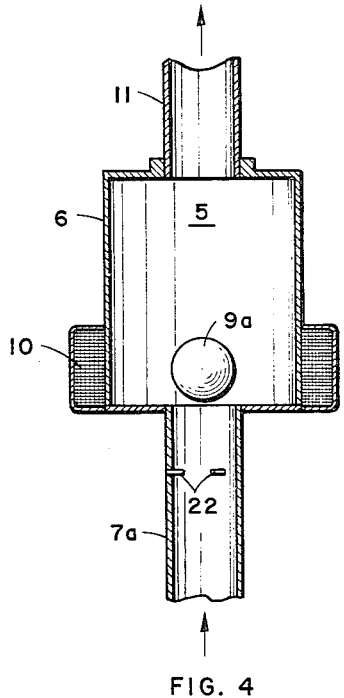
FIGURE 4 is a vertical sectional view of a third embodiment.

It is not strictly necessary that the supply tube for the fluids should be provided with a flaring mouth in every technical embodiment, nor for the supply pipe to open into a larger reaction chamber, it being possible to use an entirely cylindrical chamber with a spinning ball of somewhat smaller diameter. In principle it is also possible, for example, to allow a sphere to rest on the edge of a cylindrical supply tube; it is even possible, for example, in the case of an apparatus designed for a given capacity and for heating particular fluids, to make the diameter of a sphere smaller than that of the supply tube. Such an apparatus is shown in FIGURE 4, wherein the supply pipe 7a debouches directly into the bottom of the chamber 5 without any enlargement and carries pins 22 for limiting the downward movement of the sphere 9a. Numbers 6, 10 and 11 denote parts previously described. When the apparatus is shut down the sphere falls down onto the stop formed by the pins, which are situated entirely outside the reaction zone. In some cases this may increase the facility for inspecting the apparatus.

In addition to the inductive heating of the element it is also possible to generate a magnetic field by means of which restrictions can be placed on the movements of the element if it is made of a suitable material. This is particularly useful in an apparatus according to FIGURE 4, with a sphere having a smaller diameter than the supply tube.

Very high temperatures are generally only used in carrying out endothermic reactions, e.g., the formation of acetylene and nitrogen oxide from the elements. At extremely high temperatures the heating element may in principle emit a radiation which will initiate a particular photochemical reaction; this further widens the field of application of the invention.

The heating element may consist of any material capable of being induction-heated, such as carbon or a high-grade metal such as tungsten. In principle it is also possible for the element to be made of other materials such as molybdenum, vanadium or a carbide. The choice will be influenced by the contemplated use of the apparatus. Thus, the material should have a melting point well above the temperatures to be used and should not react with any component of the fluid stream.

I claim as my invention:

1. Apparatus for supplying heat to a fluid which comprises a reaction chamber, a supply conduit for said fluid debouching upwards into said chamber, outlet means for said chamber, a heating element situated within said chamber for heating said fluid by convection, said element having an axis of symmetry and being adapted to be freely suspended and rotated in a stream of said fluid entering the chamber from said conduit, and means for heating said heating element at a distance by electro-magnetic waves.

2. Apparatus according to claim 1 wherein said heating element is a sphere.

3. Apparatus according to claim 1 wherein said heating means includes an electrical coil spaced from said heating element and adapted to generate a magnetic field for heating said element by magnetic induction.

4. In combination with the apparatus according to claim 1, means for cooling said fluid while within said chamber.

5. Apparatus for supplying heat to a fluid which comprises a reaction chamber, a supply conduit for said fluid debouching upwards into said chamber via a calyx-shaped mouth, outlet means for said chamber, a spherical heating element having a diameter greater than that of said conduit and situated at least partly within said mouth for heating said fluid by convection, said calyx-shaped mouth being dimensioned to surround the lower part of the heating element with a small clearance, and means for heating said heating element.

6. Apparatus for supplying heat to a fluid which comprises a reaction chamber, a supply conduit for said fluid debouching upwards into said chamber, outlet means for said chamber, a heating element situated within said chamber for heating said fluid by convection, said element having an axis of symmetry and being adapted to be freely suspended and rotated in a stream of said fluid entering the chamber from said conduit, means for heating said heating element, a jacket for a coolant surrounding the chamber, and means for circulating a coolant through the jacket.

7. Apparatus for supplying heat to a fluid which comprises a reaction chamber, a supply conduit for said fluid debouching upwards into said chamber, outlet means for said chamber, a heating element situated within said chamber for heating said fluid by convection, said element having an axis of symmetry and being adapted to be freely suspended and rotated in a stream of said fluid entering the chamber from said conduit, means for heating said heating element, and means for admitting a coolant into the said reaction chamber for cooling said fluid after passing the heating element.

8. Apparatus for supplying heat to a fluid which comprises a reaction chamber, a supply conduit for said fluid debouching upwards into said chamber at the bottom thereof, a heating element situated within said chamber for heating said fluid by convection, said element having an axis of symmetry and being adapted to be freely suspended and rotated in a stream of said fluid entering the chamber from said conduit, an outlet for fluid situated above the said heating element, and means for heating said heating element.

9. Apparatus for supplying heat to a fluid which comprises a reaction chamber, an upwardly debouching supply conduit for said fluid extending upwards into said chamber through the bottom thereof and projecting to a level above said bottom, outlet means for said chamber, a heating element situated within said chamber for heating said fluid by convection, said element having an axis of symmetry and being adapted to be freely suspended and rotated in a stream of said fluid entering the chamber from said conduit, and means for heating said heating element.

10. Apparatus for supplying heat to a fluid which comprises a reaction chamber, a supply conduit for said fluid debouching upwards into said chamber, a heating element situated within said chamber for heating said fluid by convection, said element having an axis of symmetry and being adapted to be freely suspended and rotated in a stream of said fluid entering the chamber from said conduit, outlet means for fluid situated below said heating element, means for heating said heating element, and means for directing a spray of coolant downwardly into the reaction chamber toward said heating element for cooling said fluid after passing the heating element.

References Cited in the file of this patent

UNITED STATES PATENTS

| | | |
|---|---|---|
| 2,485,542 | Abrams | Oct. 25, 1949 |
| 2,533,457 | Hasche | Dec. 12, 1950 |
| 2,576,228 | Kinnaird | Nov. 27, 1951 |
| 2,762,693 | Hepp | Sept. 11, 1956 |
| 2,937,923 | Shapleigh | May 24, 1960 |